Sept. 18, 1956  F. J. KENNEDY  2,763,294
OUTLET FOR UNDERFLOOR HEADER DUCT
Filed Oct. 21, 1952
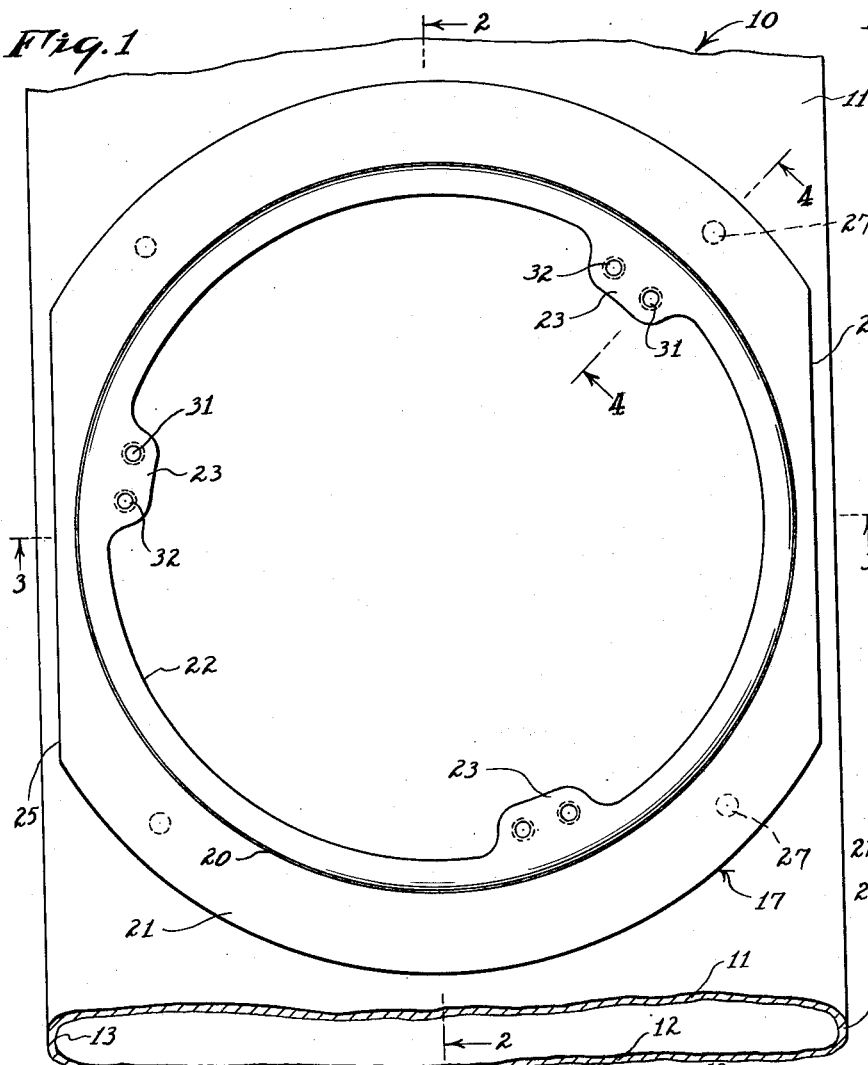
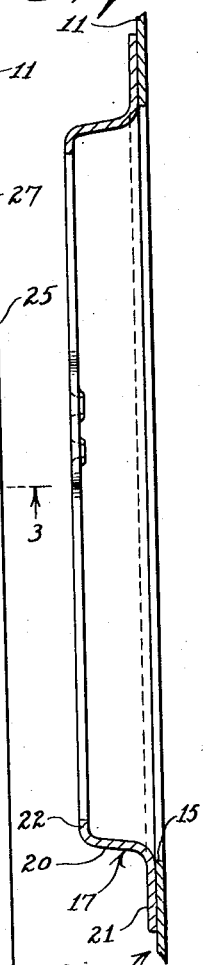
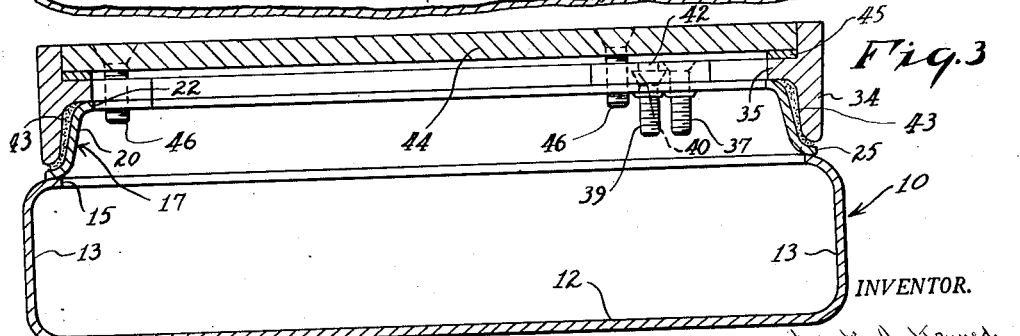
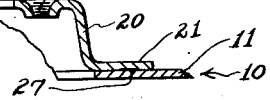
INVENTOR.
Frank J. Kennedy
BY
Emery Varney
Whittemore & Dix
ATTORNEYS United States Patent Office 2,763,294
Patented Sept. 18, 1956

2,763,294

OUTLET FOR UNDERFLOOR HEADER DUCT

Frank J. Kennedy, Pittsburgh, Pa., assignor to National Electric Products Corporation, Pittsburgh, Pa., a corporation of Delaware Application October 21, 1952, Serial No. 315,945

2 Claims. (Cl. 138—92)

This invention relates to header ducts for electric wiring, and more especially to header ducts that are placed in concrete floors. The term "header duct" is used herein broadly to designate the wire enclosures used with cellular floor constructions as well as simple underfloor duct systems.

Such header ducts are provided with outlets at spaced regions along their length. At any location where an electric outlet fitting is desired on the floor, an extension is placed above the outlet with the top of the extension at the level to which the concrete will be poured when the floor is constructed over the duct. The other outlets are capped with plates which are covered by the concrete, but whenever additional electric outlets are desired, the concrete can be broken away over capped outlets and extensions for electric outlet fittings can be installed in place of the plates.

Header ducts are constructed so as to keep moisture out of them. The outlets are sometimes made with necks and flanges that are of one-piece construction with the duct in order to have a moisture-proof construction.

It is an object of this invention to provide an improved header duct of composite construction with necks secured to the outlets by a moisture-proof connection, and with means for connecting either an extension fitting or a cover plate to the neck, and with a construction that is more economical to manufacture.

Other objects, features and advantages of the invention will appear or be pointed out as the description proceeds.

In the drawing, forming a part hereof, in which like reference characters indicate corresponding parts in all the views, Figure 1 is a top plan view of a header duct with an outlet ring secured thereto and embodying this invention;

Figures 2 and 3 are sectional views taken on the lines 2—2 and 3—3 respectively of Figure 1; and Figure 4 is a fragmentary, sectional view taken on the line 4—4 of Figure 1.

A header duct 10 has a substantially flat top wall 11 and a corresponding bottom wall 12. The header duct has side walls 13 which merge with the top and bottom walls along arcs of fair form, the header duct being preferably of one-piece construction. There is an outlet opening 15 in the top wall 11, and it will be understood that there are similar outlet openings at predetermined spaced locations along the length of the duct.

When the electrical system is initially installed, some of the outlet openings 15 are used to lead wires to electrical fittings located above the duct and above the floor in which the duct is embedded. Other outlet openings are not used, and they are reserve outlets which can be used at some later date when it may be necessary to locate electrical outlet fittings for branch conduits at different locations along the header duct. It is necessary to construct the header duct so that these outlet openings 15 can be used with either an extension fitting leading upward to the floor level, or a cover which serves as a dead-end closure for the outlet opening.

The outlet opening 15 is preferably round and it is of less diameter or width than the width of the header duct 10. An outlet ring 17 is attached to the top wall of the duct 10 to provide means for connecting either an extension fitting or a cover plate to the header duct. This outlet ring is a separate piece from the header duct, and is preferably a one-piece, drawn steel ring having a frusto conical side wall 20, an outwardly extending peripheral flange 21 at the lower end of the side wall, and an inwardly extending peripheral flange 22 at the upper end of the side wall. The upper flange 22 has inwardly projecting extensions 23 for receiving screws.

It is desirable to have the outlet opening 15 of large size in order to facilitate the locating and pulling of wires, but it is also important to have a water-proof cover over the opening. In order to obtain this result it is necessary that the outlet ring 17 be connected to the header duct by a water-proof connection. Such a connection is obtained by constructing the lower flange 21 of substantial width so that there is an annular surface of considerable extent in contact with the top of the wall of the header duct. In order to have a wide lower flange 21 with an outlet opening 15 which is almost as wide as the duct, the invention provides cut-off edges 25 along the portions of the lower flange adjacent to the side edges of the duct. In the preferred construction the flange edges 25 do not extend beyond the flat top surface of the duct, and in any case they do not project outwardly beyond the sides of the duct.

The bottom surface of the lower flange 21 contacts with the top wall 11 of the duct and is secured thereto by spot welding 27 at angularly spaced regions around the flange. Four evenly spaced spots have been found to be sufficient, but more can be used if desired. The outlet ring is constructed so as to ensure firm pressure of the lower flange against the top wall of the duct at the regions where the flange is narrow because of the cut-off edges 25, and the other portions of the flange maintains a moisture-proof connection that requires less pressure than if the flange were narrower. The spot welding 27 is preferably located approximately midway between the inner and outer limits of the lower flange so as to facilitate an equal distribution of the contact pressure between the lower flange and the top wall of the duct.

After the outlet ring 17 has been attached to the header duct by welding, bolts, or other fastening means, the assembly is lacquered. The lacquer further increases the moisture-proof character of the connection between the flange and the header duct.

The radial width of the lower flange 21, where it is not reduced by the edges 25, is substantially equal to the height of the outlet ring 17. The upper flange 22 is of much less radial width. In the preferred construction this upper flange is continuous around the entire periphery of the upper end of the ring so as to facilitate the manufacture of the ring by drawing. However, it is advantageous to keep the radial width of the upper flange 22 small so as to leave as large an opening as possible for the manipulation of the wires. The side wall 20 is frusto conical so as to obtain a taper for the drawing operation.

In the construction illustrated, the upper flange 22 is not wide enough to accommodate screws by which the cover or other fitting is to be attached to the ring. Extensions 23 are provided on the upper flange 22 at angularly spaced regions around the flange. These extensions 23 project inwardly far enough to make the flange 22, at the region of the extensions 23, somewhat more than twice the width at the other regions. This provides space for screw holes 31 and 32.

In order to obtain a larger number of threads in the holes 31 and 32, these holes are made by extruding the metal of the flange extensions 23. This extruded construction makes the depth of the holes 31 and 32 substantially greater than the thickness of the metal of the flange 22, and this makes possible a larger number of threads in the screw hole, as illustrated in Figure 4.

A cover support 34 fits over the outer ring 17. This cover support has an inwardly extending rim 35 which extends over the top of the upper flange 22 of the outlet ring 17. The rim 35 has inwardly extending portions which overlie the extensions 23 of the upper flange 22. A screw 37 extends through the rim 35 and threads into one of the holes 31 in the upper flange. Another screw 39 has its head in a recess 40 in the under face of the rim 35. A small opening 42, through the rim 35, provides access for a screw driver to turn the screw 39. Since the cover support 34 is supported by the head of the screw 39 and the similar screws at the other extensions of the flange 22, rotation of the screw 39 changes the height of the portion of the cover support immediately over this screw.

By manipulating the different screws 39, at different angularly spaced locations around the outlet ring, the cover support can be made level with the intended level of the floor, even though the header duct is not exactly level. Whenever one of the leveling screws 39 is to be backed away from the flange 22, the attaching screw 37 has to be backed away also, either before the leveling screw is moved or at the same time that the leveling screw is being backed away. Clearance between the ring 17 and the cover support 34 is sealed with asphaltum compound 43.

A cover plate 44 rests upon a gasket 45 supported by the top wall of the inwardly extending rim 35. This cover plate 44 is clamped against the gasket 45 by countersunk screws 46 which pass through the cover plate 44 and downwardly through the threaded opening in the inwardly extending rim 35.

The preferred embodiment of the invention has been illustrated and described. Terms of orientation are, of course, relative; and changes and modifications can be made in the illustrated construction without departing from the invention as defined in the claims.

What is claimed is:

1. A header duct for electric wiring, the duct having a substantially flat top wall with an opening therethrough extending across most but not all of the width of the top wall, the duct having also side walls that connect with the top wall along its longitudinal edges, a ring open at both ends and comprising a one-piece sheet metal element having an outwardly extending bottom flange at its lower end with a bottom face that fits against the top wall of the duct around the opening in the top wall, and an inwardly extending top flange at the upper end of the ring, said bottom face being parallel to the top wall of the duct and held against said top wall around the entire periphery of the opening in the top wall to seal against entrance of water, the portion of said ring between the flanges diverging toward the lower open end of the ring so that the ring is adapted to be made by a drawing operation, and connections between the bottom flange and the top wall at angularly spaced regions around said bottom flange for holding the bottom flange against the top wall, said flange having a diameter greater than the width of the duct at those portions of the top wall which are at a substantial distance from the side walls but the flange having cut-off sections at opposite sides of the opening and extending immediately adjacent to the side walls but of substantially less radial width than the portions of the flange that have a diameter greater than the width of the duct.

2. The header duct described in claim 1 and in which the inwardly extending flange at the upper end of the ring has extruded and threaded openings therein for receiving screws for holding an extension frame or a cover on the upper end of the ring.

References Cited in the file of this patent

UNITED STATES PATENTS

| 872,029 | Stewart | Nov. 26, 1907 |
| 919,940 | Paiste | Apr. 27, 1909 |
| 943,338 | Carter et al. | Dec. 14, 1909 |
| 1,795,062 | Warner | Mar. 3, 1931 |
| 1,969,043 | Sharp | Aug. 7, 1934 |
| 1,996,371 | Fullman | Apr. 2, 1935 |
| 2,041,965 | Sargent | May 26, 1936 |
| 2,167,597 | Webb | July 25, 1939 |
| 2,297,179 | Walker | Sept. 29, 1942 |
| 2,596,236 | Glosier | May 13, 1952 |
| 2,632,620 | Hurley | Mar. 24, 1953 |

OTHER REFERENCES

Fountain's Catalog, 1904, received September 22, 1906.